(12) United States Patent
Takahashi et al.

(10) Patent No.: US 9,293,941 B2
(45) Date of Patent: Mar. 22, 2016

(54) CHARGER AND CHARGING APPARATUS

(76) Inventors: Sachio Takahashi, Morioka (JP); Kazuo Fuda, Morioka (JP)

(*) Notice: Subject to any disclaimer, the term of this patent is extended or adjusted under 35 U.S.C. 154(b) by 415 days.

(21) Appl. No.: 13/580,845

(22) PCT Filed: Jan. 25, 2011

(86) PCT No.: PCT/JP2011/000374
§ 371 (c)(1),
(2), (4) Date: Sep. 18, 2012

(87) PCT Pub. No.: WO2011/105005
PCT Pub. Date: Sep. 1, 2011

(65) Prior Publication Data
US 2013/0009593 A1 Jan. 10, 2013

(30) Foreign Application Priority Data
Feb. 26, 2010 (JP) .................................. 2010-041823

(51) Int. Cl.
*H02J 7/00* (2006.01)
*B60L 3/00* (2006.01)

(52) U.S. Cl.
CPC ............. *H02J 7/0093* (2013.01); *B60L 3/0046* (2013.01); *H02J 7/0091* (2013.01)

(58) Field of Classification Search
CPC .......... H02J 7/0073; H02J 7/041; H02J 7/082
See application file for complete search history.

(56) References Cited

U.S. PATENT DOCUMENTS

| | | | |
|---|---|---|---|
| 5,747,969 A * | 5/1998 | Tamai | 320/141 |
| 5,828,019 A * | 10/1998 | Joyce | 200/38 B |
| 2004/0090209 A1 | 5/2004 | Nishida et al. | |
| 2004/0195996 A1 | 10/2004 | Nishida | |

(Continued)

FOREIGN PATENT DOCUMENTS

| | | |
|---|---|---|
| JP | 7-111165 A | 4/1995 |
| JP | 7-336908 A | 12/1995 |
| JP | 10-32936 A | 2/1998 |

(Continued)

OTHER PUBLICATIONS

WIPO, "International Preliminary Report on Patentability" for PCT/JP2011/000374, Sep. 18, 2012.

(Continued)

*Primary Examiner* — Vuthe Siek
*Assistant Examiner* — Aric Lin
(74) *Attorney, Agent, or Firm* — Manabu Kanesaka

(57) ABSTRACT

A reduction in breakdown voltage and mechanical deterioration of an electrode plate of a rechargeable battery are suppressed, and a charging time is shortened.

There is provided a charger 10 which charges a rechargeable battery, comprising: a first output unit which outputs a first voltage; a second output unit which outputs a second voltage having a predetermined voltage value different from that of the first voltage; a charge control unit 16 which inputs the first voltage and the second voltage, alternately outputs these voltages, and supplies them to the rechargeable battery as charging voltages; a charged-amount detection unit 14 which measures a charged amount of the rechargeable battery; and an output control unit 15 which carries out control in such a manner that an output time of the first voltage and/or the second voltage in the charge control unit 15 is prolonged as the charged amount increases.

4 Claims, 10 Drawing Sheets

(56) References Cited

U.S. PATENT DOCUMENTS

| | | | |
|---|---|---|---|
| 2004/0232886 A1* | 11/2004 | Marinka-Toth et al. | 320/139 |
| 2008/0284379 A1* | 11/2008 | Hirano | 320/150 |

FOREIGN PATENT DOCUMENTS

| | | | | |
|---|---|---|---|---|
| JP | 10-262342 A | | 9/1998 | |
| JP | 10262342 A | * | 9/1998 | H02J 7/02 |
| JP | 2003-157908 A | | 5/2003 | |
| JP | 2003-299256 A | | 10/2003 | |
| JP | 2004-168126 A | | 6/2004 | |
| JP | 2004-343936 A | | 12/2004 | |
| JP | 2007-274846 A | | 10/2007 | |
| JP | 2009-38948 A | | 2/2009 | |
| JP | 2009038948 A | * | 2/2009 | H02J 7/00 |
| JP | 2009-219336 A | | 9/2009 | |
| WO | WO 03/026095 A1 | | 3/2003 | |

OTHER PUBLICATIONS

China Patent Office, "Office Action for CN 201180011083.9," Jul. 2, 2014.

* cited by examiner

FIG. 7

| CHARGED AMOUNT OF STORAGE BATTERY [Ah] | 0~20 | 21~40 | 41~60 | 61~80 | 81~85 | 86~90 | 91~95 | 96~ |
|---|---|---|---|---|---|---|---|---|
| SWITCHING TIME [sec] | 5 | 6 | 7 | 8 | 9 | 10 | 11 | 12 |

CHARGER AND CHARGING APPARATUS

TECHNICAL FIELD

The present invention relates to a charger that charges a rechargeable battery (a battery) mounted in a vehicle and a charging apparatus comprising the plurality of chargers, and more particularly to a charger and a charging apparatus which realize quick charging.

BACKGROUND ART

In each of vehicles such as an electric-powered car and a hybrid car, a power battery or an auxiliary battery is mounted. As this kind of battery, there is often used a so-called assembled battery in which many storage batteries are connected in series.

Further; each of some vehicles has a charger which is used for charging a battery mounted therein. The charger converts a commercial power source of 100 V or 200 V into a predetermined voltage and supplies the converted voltage to a battery, whereby the battery is charged.

When this charger is used to charge the assembled battery, as shown in FIG. 9, a predetermined voltage is applied to the entire assembled battery 200 to perform charging (see, e.g., Patent Literature 1).

Specifically, for example, a charger 110 for 140 V is connected to the assembled battery 200 in which 10 storage batteries BTT of 14 V are coupled, whereby the charging is performed.

However, when the assembled battery is charged in such a configuration, a considerable time is required until completion. For example, as shown in FIG. 10, when a substantially fixed amount of charging voltage is continuously supplied, a long charging time of approximately eight hours is required. In this case, a user has to wait for eight hours until the next driving, which is not practical.

Therefore, technologies that shorten the charging time have been suggested. For example, there has been suggested a technology for intermittently controlling supply and stop of a charging current to allow the charging current to flow in a pulsed manner. (see, e.g., Patent Literature 2).

When the pulse charging is performed as in the case of this technology, the charging time can be shortened as compared with a situation where a fixed amount of charging voltage is supplied.

CITATION LIST

Patent Literatures

Patent Literature 1: Japanese Unexamined Patent Application Publication No. 2007-274846 (FIG. 3)
Patent Literature 2: Japanese Unexamined Patent Application Publication No. Hei 07-111165

DISCLOSURE OF THE INVENTION

Solution to Problem

However, the technology disclosed in Patent Literature 2 has the following problems.

According to this technology, when the charging current is supplied for a fixed time, this supply is then completely stopped, and thereafter the supply of the charging current is restarted. That is, the charging current of I [A] flows during the supply, 0 [A] remains without flow of the charging current during the stop, and this process is repeated. Then, at a time of the restart of the supply, the charging current abruptly increases from 0 [A] to I [A], an in addition, this abrupt increase occurs every predetermined time (e.g., every 10 seconds). Thus, this processed is repeated again and again until the charging is completed, and hence a burden is imposed on an electrode plate of the battery, thereby leading to a problem that this burden causes reduction in breakdown voltage and mechanical deterioration.

Furthermore, in Patent Literature 1, a voltage is applied to the entire assembled battery having many storage batteries coupled with each other to perform the charging. In this case, as the charging voltage from a charger, there is employed a value obtained by multiplying a rated terminal voltage of one storage battery by the number of storage batteries and further multiplying this product by a predetermined number, and hence the charging voltage is very high. For instance, in an example shown in FIG. 9, since 10 storage batteries having a rated terminal voltage of 14 V are coupled with each other, a charger of 140 V is used. Thus, the charging voltage is 140 V×1.4 V=196 V (see FIG. 10). Additionally, when a commercial power source is used as a power source, for example, 100 V is boosted to 196 V, so that a charging current decreases. Therefore, one storage battery is charged with a low current, which results in a cause that increases a charging time.

In view of the above-described problem, it is an object of the present invention to provide a charger and a charging apparatus that can suppress decrease in breakdown voltage and mechanical deterioration of an electrode plate of a battery (a rechargeable battery) and greatly shorten a charging time.

Means for Solving Problem

To this end, a charger according to the present invention, which is a charger that charges a rechargeable battery, comprises: a first output unit which outputs a first voltage; a second output unit which outputs a second voltage having a predetermined voltage value different from that of the first voltage; a charge control unit which inputs the first voltage and the second voltage, alternately outputs them, and supplies them to the rechargeable battery as charging voltages; a charged-amount detection unit which measures a charged amount of the rechargeable battery; and an output control unit that carries out control so as to prolong an output time of the first voltage and/or the second voltage in the charge control unit as the charged amount increases.

Moreover, a charging apparatus according to the present invention is a charging apparatus that'charges a plurality of rechargeable batteries, wherein the charging apparatus comprises the plurality of chargers, and each charger is connected to each rechargeable battery based on a one-to-one correspondence.

Effect of the Invention

According to the charger and the charging apparatus of the present invention, since the first voltage having a predetermined voltage value and the second voltage having a predetermined voltage value different from this first voltage are alternately supplied, abrupt supply from 0 V is no longer performed, reduction in breakdown voltage and mechanical deterioration of an electrode plate of the battery can be suppressed.

Additionally, since the plurality of chargers are provided and the plurality of batteries are connected to the respective charger based on a one-to-one correspondence, the charging voltage can be reduced, and a large amount of charging current is allowed to flow. As a result, the charging time can be greatly reduced.

BRIEF DESCRIPTION OF DRAWINGS

FIG. 7 is a graphic chart showing a correspondence of a charged amount in the rechargeable battery and a switching time;

BEST MODE FOR CARRYING OUT THE INVENTION

Figure 1:
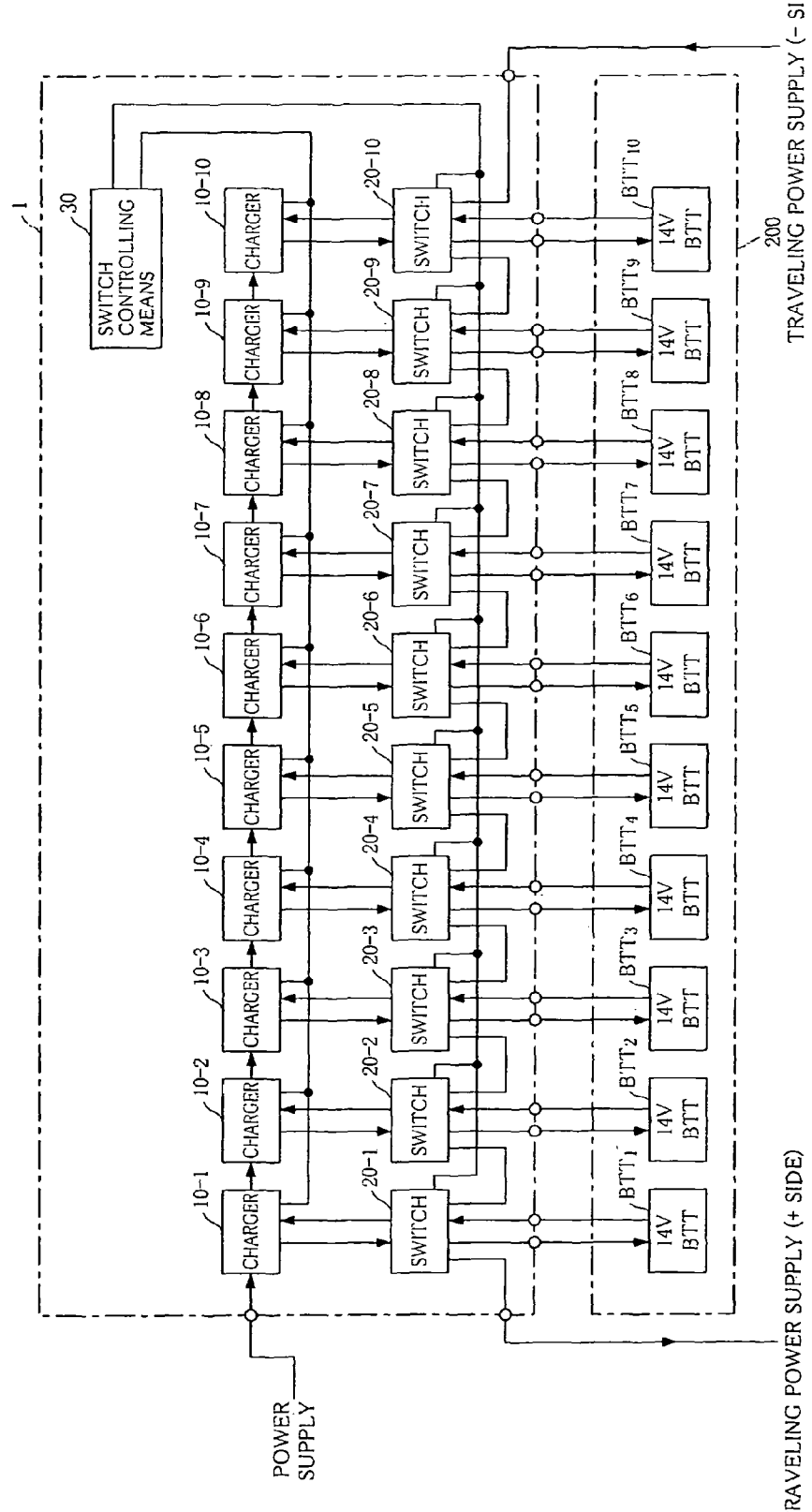
FIG. 1 is a block diagram showing a configuration of a charging apparatus according to an embodiment of the present invention.

A preferred embodiment of a charger and a charging apparatus according to the present invention will now be described hereinafter with reference to drawings.
[Configurations of Charger and Charging Apparatus]

Configurations of a charger and a charging apparatus according to the present invention will be first described with reference to FIG. 1.

This drawing is a block diagram showing a configuration of a charging apparatus according to this embodiment.

As shown in the drawing, a charging apparatus 1 comprises a plurality of chargers 10 (10-1 to 10-10), switches 20 (20-1 to 20-10), and switch controlling means 30.

Here, the plurality of chargers 10 are provided. In particular, the same number/higher number of the chargers 10 as/than charging target batteries can be provided. For example, when an assembled battery 200 having a plurality of (10 in the drawing) coupled storage batteries BTT therein is a charging target, the same number (10 in the drawing)/higher number of the chargers 10 as/than the storage batteries BTT can be provided.

It is to be noted that the target of the charging performed by the chargers 10 or the charging apparatus 1 is the storage batteries BTT or the assembled battery 200, the target of charging is not restricted to the storage batteries BTT or the assembled battery 200, and it can be rechargeable batteries in general.

Additionally, in this embodiment, the "battery" means a battery that can be mounted in a vehicle in rechargeable batteries. That is, the "battery" includes the storage battery BTT or the assembled battery 200. Further, the vehicle includes cars (A four-wheel vehicle, a three-wheel vehicle, and a two-wheel vehicle are included. Further, a golf cart, a bullpen car, and others are also included.), an air craft, an agricultural machine, and others.

Figure 2:
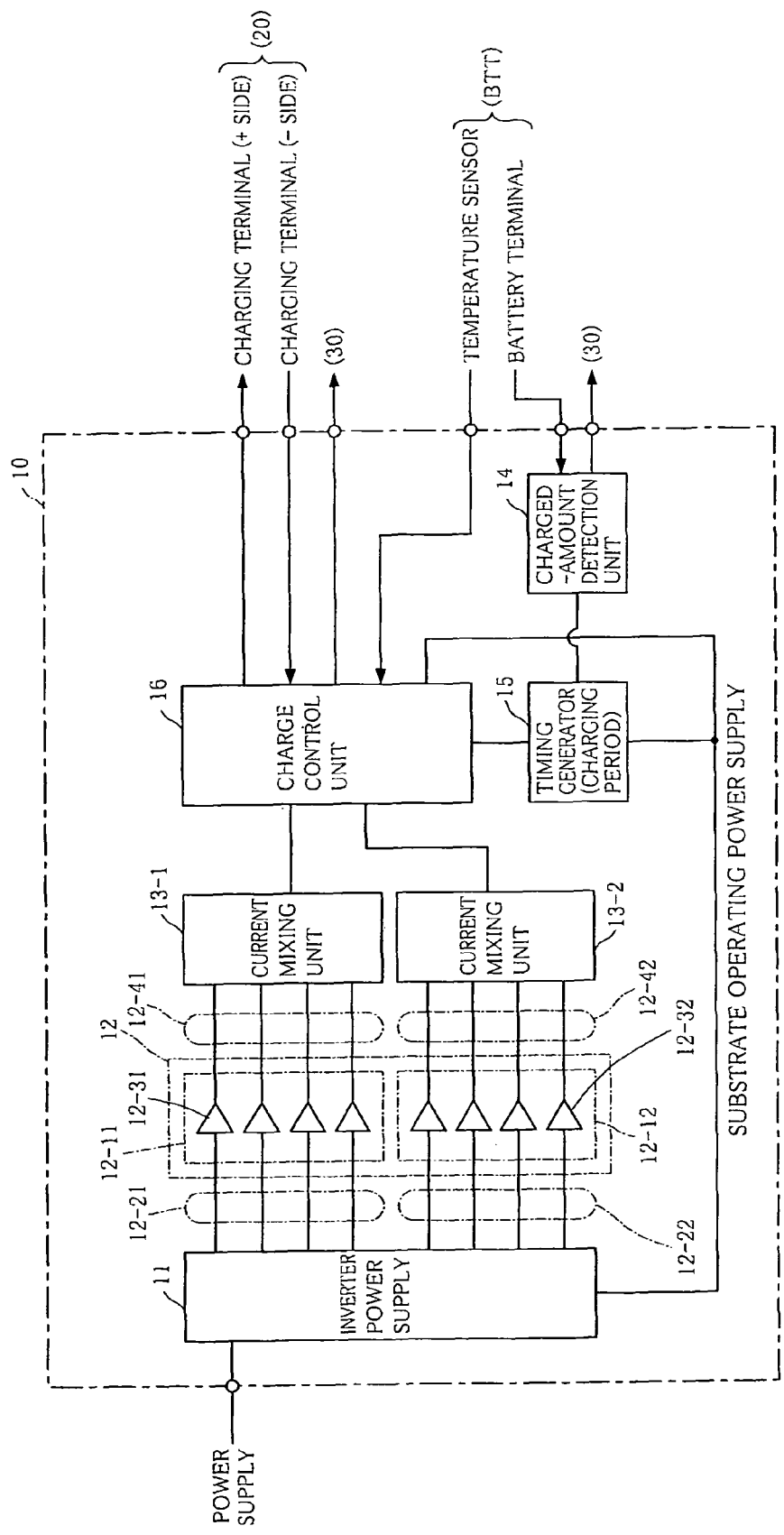
FIG. 2 is a block diagram showing a configuration of a charger.

As shown in FIG. 2, each charger 10 has an inverter power supply 11, rectifiers 12, current mixing units 13 (13-1, 13-2), a charged-mount detection unit 14, a timing generator 15, and a charge control unit 16.

The inverter power supply 11 inputs a power supply voltage from the outside. As this input voltage, for example, a commercial alternating current power supply of 100 V or 200 V can be used.

Further, the inverter power supply 11 converts the input voltage into a first voltage (a trickle voltage) having a predetermined voltage value and outputs this converted voltage, and also converts the input voltage into a second voltage (a quick voltage) having a predetermined voltage value different from that of the first voltage and outputs this converted voltage.

The trickle voltage constitutes a lower voltage in charging voltages. This trickle voltage can be set to approximately 1.4-fold of a rated terminal voltage of the storage battery BTT. Specifically, for example, as shown in FIG. 1, when the rated terminal voltage of the storage battery BTT is 14 V, the trickle voltage can be set to 18.8 V (which is approximately 1.34-fold of 14 V).

The quick voltage constitutes a higher voltage in the charging voltages. That is, the quick voltage is a voltage having a higher voltage value than that of the trickle voltage. This quick voltage can be set to approximately 2.3-fold of the rated terminal voltage of the storage battery BIT Specifically, for example, as shown in FIG. 1, when the rated terminal voltage of the storage battery BTT is 14 V, the quick voltage can be set to 32.0 V (which is approximately 2.29-fold of 14 V).

As described above, the trickle voltage and the quick voltage are not 0 V, and they are alternating-current voltages having predetermined voltage values, respectively.

It is to be noted that the inverter power supply 11 outputs the first voltage (the trickle voltage), and hence it has a function as a "first output unit". Further, the inverter power supply 11 outputs the second voltage (the quick voltage), and hence it has a function as a "second output unit".

The rectifier 12 rectifies the alternating-current voltage (each of the trickle voltage and the quick voltage) output from the inverter power supply 11 and converts the rectified voltage into a direct current.

As this rectifier 12, there are a trickle voltage rectifier (a first rectifier) 12-11 and a quick voltage rectifier (a second rectifier) 12-12.

The first rectifier 12-11 is connected to the inverter power supply 11 through a plurality of input-side wiring lines 12-21 (four in FIG. 2), and output currents from the inverter power supply 11 are input from the respective input-side wiring lines 12-21. Furthermore, rectifying circuits 12-31 connected to the respective input-side wiring lines 12-21 rectify the trickle voltage and convert it into a direct-current voltage.

The second rectifier 12-12 is connected to the inverter power supply 11 through a plurality of input-side wiring lines 12-22 (four in FIG. 2), and output currents from the inverter power supply 11 are input from the respective input-side wiring lines 12-22. Moreover, rectifying circuits 12-32 connected to the respective input-side wiring lines 12-22 rectify the quick voltage and convert it into a direct-current voltage.

The inverter power supply 11 is connected to the respective rectifiers 12-11 and 12-12 through the plurality of input-side wiring lines 12-21 and 12-22 in order to assure a large current.

In the charger 10 according to this embodiment, it is assumed that the charging current is up to 80 A in order to charge the storage battery BTT of 14 V. Assuming that a breakdown voltage is 2.5-fold of this voltage, designing each rectifier 12 so as to withstand 200 A is desirable. Here, for example, when a rectifying element (a diode) having a rated current of 50 A is used, aligning the four rectifying elements enables a current of 200 A to flow as a whole. As described above when an output current from the inverter power supply 11 is split and allowed to flow through the plurality of input-side wiring lines 12-21 and 12-22 and these split currents are rectified by the rectifying circuits 12-21 and 12-21, a large current (a charging current) of 200 A can be assured while using the rectifying elements each having 50 A.

It is to be noted that, in FIG. 2, the four rectifying circuits 12-31 or the four counterparts 12-32 are arranged in each of the trickle voltage rectifier 12-11 and the quick voltage rectifier 12-12, and the input-side wiring lines 12-21 or 12-22 are connected to each of these rectifying circuits 12-31 and 12-32, the number of the rectifying circuits 12-31 or 12-32 or the input-side wiring lines 12-21 or 12-22 is not restricted to four, and an arbitrary number can be adopted.

Moreover, when the rectifying element having a rated current that can permit the current of the trickle voltage or the quick voltage output from the inverter power supply 11 can be used, only one rectifying current 12-3 having this rectifying element can be provided to each of the trickle voltage rectifier 12-11 and the quick voltage rectifier 12-12, and an input-side wiring line 12-2 can be connected to this rectifying circuit 12-3.

The current mixing unit 13 (13-1 or 13-2) mixes a plurality of currents output from the rectifier 12.

As this current mixing unit 13, there are a trickle voltage current mixing unit (a first current mixing unit) 13-1 and a quick voltage current mixing unit (a second current mixing unit) 13-2.

The first current mixing unit 13-1 is connected to the first rectifier 12-11 through a plurality of (the same number as the rectifying circuits 12-31) output-side wiring lines 12-41 (four in FIG. 2), inputs output currents from the first rectifier 12-11 from the respective output-side wiring lines 12-41, mixes these currents, and outputs a mixed current.

The second current mixing unit 13-2 is connected to the second rectifier 12-12 through a plurality of (the same number as the rectifying circuits 12-32) output-side wiring lines 12-42 (four in FIG. 2), inputs output currents from the second rectifier 12-12 from the respective output-side wiring lines 12-42, mixes these currents, and outputs a mixed current.

It is to be noted that, when one rectifying circuit 12-3 is provided to each of the rectifiers 12-11 and 12-12, each of the rectifiers 12-11 and 12-12 has one input-side wiring line 12-2 and one output-side wiring line 12-4 (in case of a single line delineation). In this case, the output current from the inverter power supply 11 is not split, the output current does not have to be mixed. Therefore, in this case, the current mixing unit 13 can be omitted.

The charge-amount detection unit 14 detects a charged amount in the storage battery BTT. The detected charged amount is, supplied to the timing generator 15.

Further, the charge-amount detection unit 14 compares the charged amount with a threshold value, and it supplies a charging stop signal to a stop signal supply unit 32 (which will be described later) of the switch controlling means 30 if the charged-mounted detection unit 14 detects that the charged-amount has reached the threshold value.

The timing generator (an output control unit) 15 determines a charging period based on the charged amount supplied from the charged-amount detection unit 14 and outputs a switching signal. Output timing of this switching signal will be explained in later-described "output control of a charging voltage" in detail.

The charge control unit 16 inputs the trickle voltage (the first voltage) from the first current mixing unit 13-1, inputs the quick voltage (the second voltage) from the second current mixing unit 13-2, and inputs the switching signal from the timing generator 15. Furthermore, the charge control unit 16 alternately outputs the trickle voltage and the quick voltage in accordance with input timing of the switching signal and applies them to the storage battery BTT as charging voltages.

Moreover, upon receiving a measured temperature from a temperature sensor disposed to the storage battery BTT (the assembled battery 200) (see FIG. 2), the charge control unit 16 compares this measured temperature with a threshold value, and it supplies a charging stop signal to the stop signal supply unit 32 (which will be described later) of the switch controlling means 30 if the charge control unit 16 detects that the measured temperature has reached the threshold value.

It is to be noted that the inverter power supply 11, the timing generator 15, and the charge control unit 16 can be operated by using a substrate operating power supply.

As shown in FIG. 1, the same number of the switches 20 as the chargers 10 are provided. Additionally, the same number or the higher number of the switches 20 as/than the storage batteries BTT as targets of charging can be provided. For example, when the assembled battery 200 having 10 coupled storage batteries BTT of 14 V therein is a target of charging, the 10 or more switches 20 can be provided.

Further, the plurality of switches 20 are connected to the plurality of chargers 10 based on a one-to-one correspondence. Furthermore, the plurality of switches 20 are connected to the plurality of storage batteries BTT based on a one-to-one correspondence. Therefore, one charger 10 charges one storage battery BTT through one switch 20.

Figure 3:
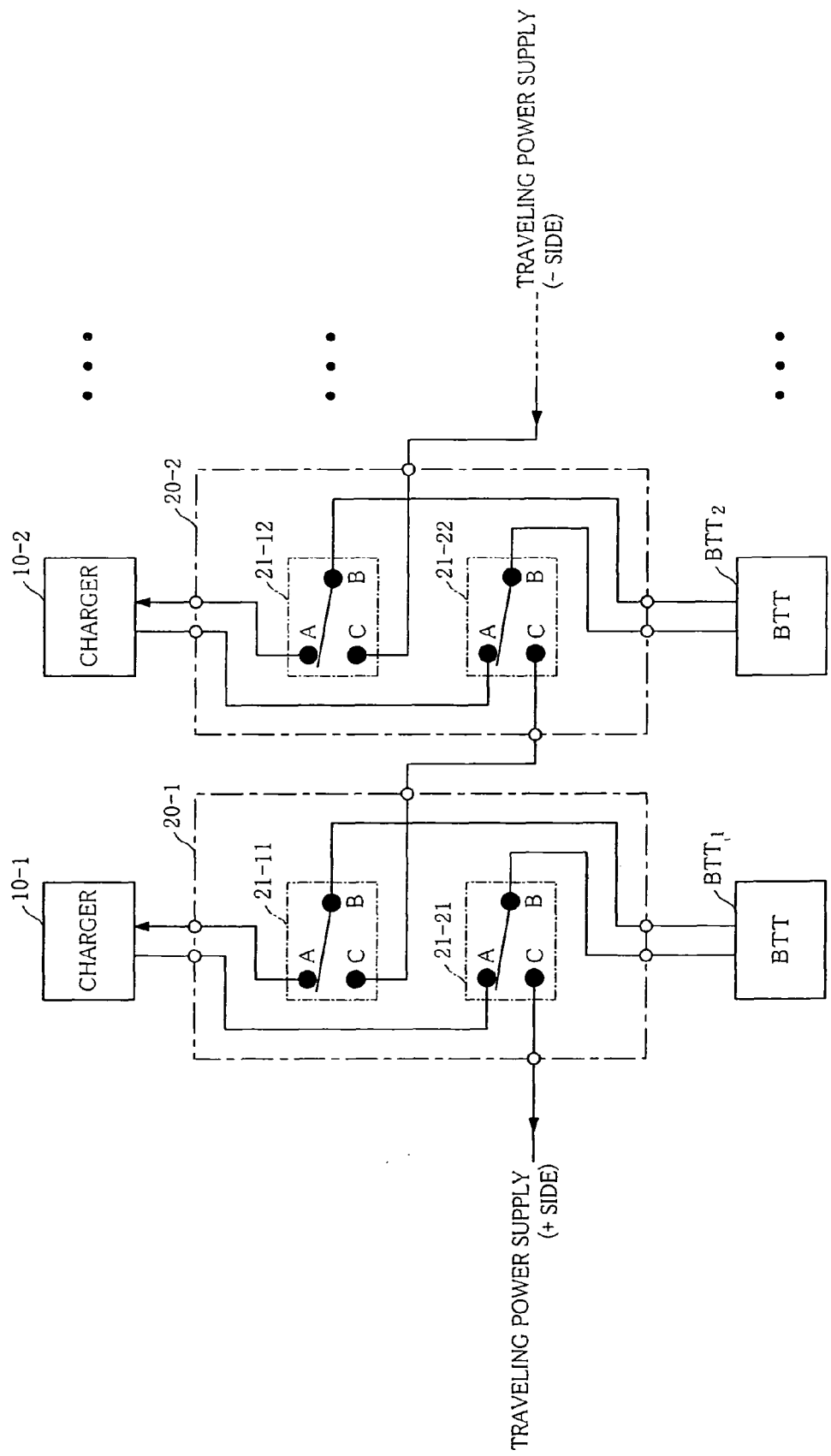
FIG. 3 is a block diagram showing a configuration of a switch.

As shown in FIG. 3, this switch 20 has a minus relay 21-1 (21-11 to 21-1*n*) and a plus relay 21-2 (21-21 to 21-2*n*). It is to be noted that n is the number of the switches 20 provided in the charging apparatus 1.

The minus relay 21-1 is a relay (an electric relay) connected to a minus side of the charger 10 or the storage battery BTT, and it has a contact point A, a contact point B, and a contact point C.

The contact point A is connected to the minus side of the charger 10.

The contact point B is a common terminal, and it is connected to the minus side of the storage battery BTT.

The contact point C is connected to the contact point C of the plus relay 21-2 provided to the switch 20 adjacent to the minus side of a traveling power supply. It is to be noted that, if there is no switch 20 that is adjacent to the minus side of the traveling power supply, the contact C is connected to a minus terminal of the traveling power supply in an electrical circuit of a vehicle having the charging apparatus 1 mounted therein.

The plus relay 21-2 is a relay (an electric relay) connected to a plus side of the charger 10 or the storage battery BTT, and it has a contact point A, a contact point B, and a contact point C.

The contact point A is connected to the plus side of the charger 10.

The contact point B is a common terminal, and it is connected to the plus side of the storage battery BIT.

The contact point C is connected to the contact point C of the minus relay 21-1 provided to the switch 20 adjacent to the plus side of the traveling power supply. It is to be noted that, if there is no switch 20 that is adjacent to the plus side of the traveling power supply, the contact point C is connected to a plus terminal of the traveling power supply in the electrical circuit of the vehicle having the charging apparatus 1 mounted therein.

Here, when each relay 21 (21-1 or 21-2) is switched to the contact point A, the charger 10 is connected to the storage battery BTT, and a path (a first path) along which the respective storage batteries BTT are disconnected is formed. Specifically, there is formed a path running through the plus side of the charger 10, the contact point A of the plus relay 21-2, the contact point B of the plus relay 21-2, the plus side of the storage battery BTT, the minus side of the storage battery BTT, the contact point B of the minus relay 21-1, the contact point A of the minus relay 21-1, and the minus side of the charger 10 in the mentioned order.

On the other hand, each relay 21 is switched to the contact point C, the charger 10 is disconnected from the storage battery BTT, and a path (a second path) along which the respective storage batteries BTT are connected is formed. Specifically, there is formed a path running through the minus side of the traveling power supply, the contact point C of the minus relay 21-1, the contact point B of the minus relay 21-1, the minus side of the storage battery BTT, the plus side of the storage battery BTT, the contact point B of the plus relay 21-2, the contact point C of the plus relay 21-2, the contact point C of the minus relay 21-1 of the adjacent switch 20, the contact point B of the minus relay 21-1, the minus side of the storage battery BTT, the plus side of the storage battery BTT, the contact point B of the plus relay 21-2, the contact point C of the plus relay 21-2, the contact point C of the minus relay 21-1 of the adjacent switch 20, . . . , the contact point C of the plus relay 21-2, and the plus side of the traveling power supply in the mentioned order.

In this manner, the relay 21 (and the switch 20 having this relay) can switch the first path and the second path.

It is to be noted that, since contact point A of each relay 21 is connected to the first path, it has a function as a "first contact point". Furthermore, since the contact point C is connected to the second path, it has a function as a "second contact point".

As the relay 21, for example, a direction limit type drum switch can be used.

Figure 4:
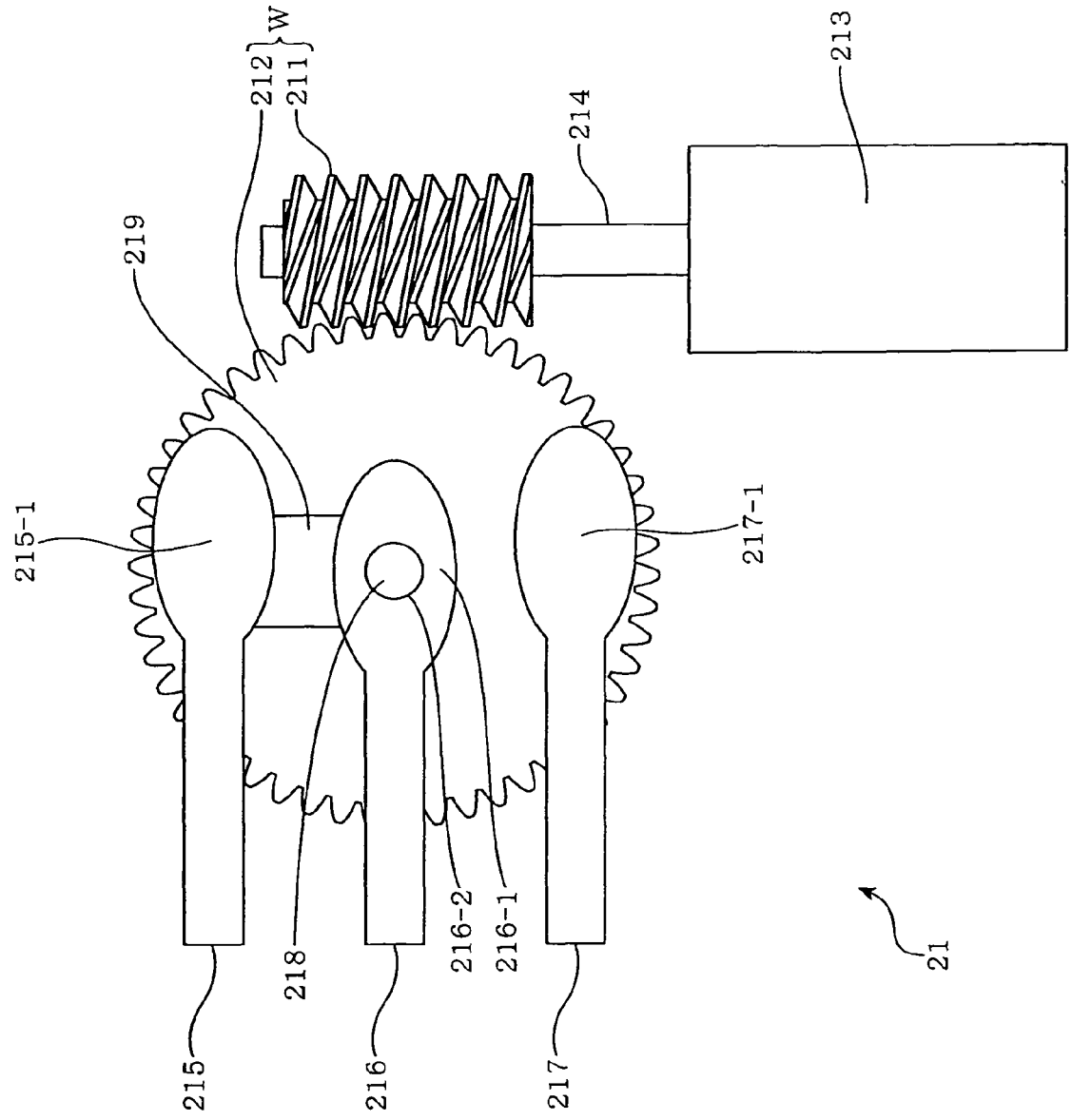
FIG. 4 is a front external view showing a configuration of a relay.

Specifically, as shown in FIG. 4, the relay 21 can be configured to use a worm gear W.

The worm gear W has a worm portion 211 having teeth spirally formed on a surface of a cylindrical member and a gear portion (a gear drum) 212 having teeth on an edge of a discoid member. Further, these teeth are meshed with each other and arranged in such a manner that an axial direction of the worm portion 211 become orthogonal to an axial direction of the gear portion 212. As a result, when the worm portion 211 is rotated, the gear portion 212 rotationally moves or rotates.

The worm portion 211 is coupled with a shaft portion 214 of a motor 213 and rotates with rotation of the shaft portion 214.

The motor 213 is driven by control of the switch controlling means 30 and rotates the shaft portion 214. Further, the motor 213 stops driving by braking control of the switch control means 30 and stops rotation of the shaft portion 214.

Therefore, the worm portion 211 has a role in transmitting rotative power of the motor 213 to the gear portion 212. Furthermore, when the rotation of the motor 213 is controlled, the rotation or the rotational movement of the gear portion 212 can be controlled.

In the vicinity of a circular surface of the gear portion 212, a contact point A215, a contact point B216, and a contact point C217, each of which is formed into a plate-like shape, are arranged in parallel.

Of these contact points, a hole 216-2 is formed in an end portion 216-1 of the contact point B216 and communicates with a hole (not shown) formed at the center of the gear portion 212. A rotary shaft 218 is inserted into the hole 216-2 of the contact hole B216 and the hole of the gear portion 212. The gear portion 212 rotates or rotationally moves about its rotary shaft 218.

A rotating contact point (a connection member) 219 is disposed to a circular surface (a surface facing the contact point A215 and the like) of the gear portion 212 through an insulator (not shown).

One end of the rotating contact point 219 is in contact with the contact point B 216 in the vicinity of the center of the gear portion 212. This rotating contact point 219 is constantly in contact with the contact point B216 irrespective of an angle at which the gear portion 212 is placed by the rotation or the rotational movement. As a result, the contact point B216 plays a role as a common.

The other end of the rotating contact point 219 has reached the vicinity of the edge of the gear portion 212. Therefore, when the gear portion 212 rotates or rotationally moves, the other end of the rotating contact point 219 moves on a circle with the rotary shaft 218 at the center.

This rotating contact point 219 is configured to come into contact with the contact point A215 or the contact point C217 with the rotation or the rotational movement of the gear portion 212.

For example, as shown in FIG. 4, in a situation where an end portion 215-1 of the contact point A215, the end portion 216-1 of the contact point B216, and an end portion 217-1 of the contact point C217 are arranged side by side and the end portion 215-1 of the contact point A215 and the end portion 217-1 of the contact point C217 are placed in the vicinity of the edge of the gear portion 212, when the other end of the rotating contact point 219 moves closer to the end portion 215-1 of the contact point A215, a convex portion (not shown) formed at the other end of the rotating contact point 219 comes into contact with a back side of the end portion 215-1 of the contact point A215. As a result, the contact point B216 is connected to the contact point A215 through the rotating contact point 219, thereby achieving electrical conduction.

Further, when the gear portion 212 rotates or rotationally moves and the other end of the rotating contact point 219 moves closer to the end portion 217-1 of the contact point C217, a convex portion (not shown) formed at the other end of the rotating contact point 219 comes into contact with a back side of the end portion 217-1 of the contact point C217. As a result, the contact point B216 is connected to the contact point C217 through the rotating contact point 219, thereby achieving electrical conduction.

In this manner, the rotating contact point 219 connects the two contact point (the contact point B216 and the contact point A215 or the contact point B216 and the contact point C217).

It is to be noted that, when the rotating contact point 219 is in contact with the contact point A215, it does not come into contact with the contact point C217. On the other hand, when the rotating contact point 219 is in contact with the contact point C217, it does not come into contact with the contact point A215. As a result, the circuit is prevented from being short-circuited.

Further, a convex portion (not shown) configured to come into contact with the rotating contact point 219 can be, formed on a back side of each end portion 215-1 or 217-1 of the contact point A215 or the contact point C217.

Furthermore, a direction of the rotation or the rotational movement of the gear portion 212 may be a right-hand turning direction (a clockwise direction) or a left-hand turning direction (a counterclockwise direction).

The switch controlling means 30 instructs the relay 21 of each switch 20 to switch between the contact point A215 and the contact point C217. That is, the switch controlling means 30 has a function of collectively switching start and stop of the charging from the respective chargers 10-1 to 10-10 to the storage batteries B17-1 to BTT-10 by collectively operating the plurality of switches 20.

Figure 5:
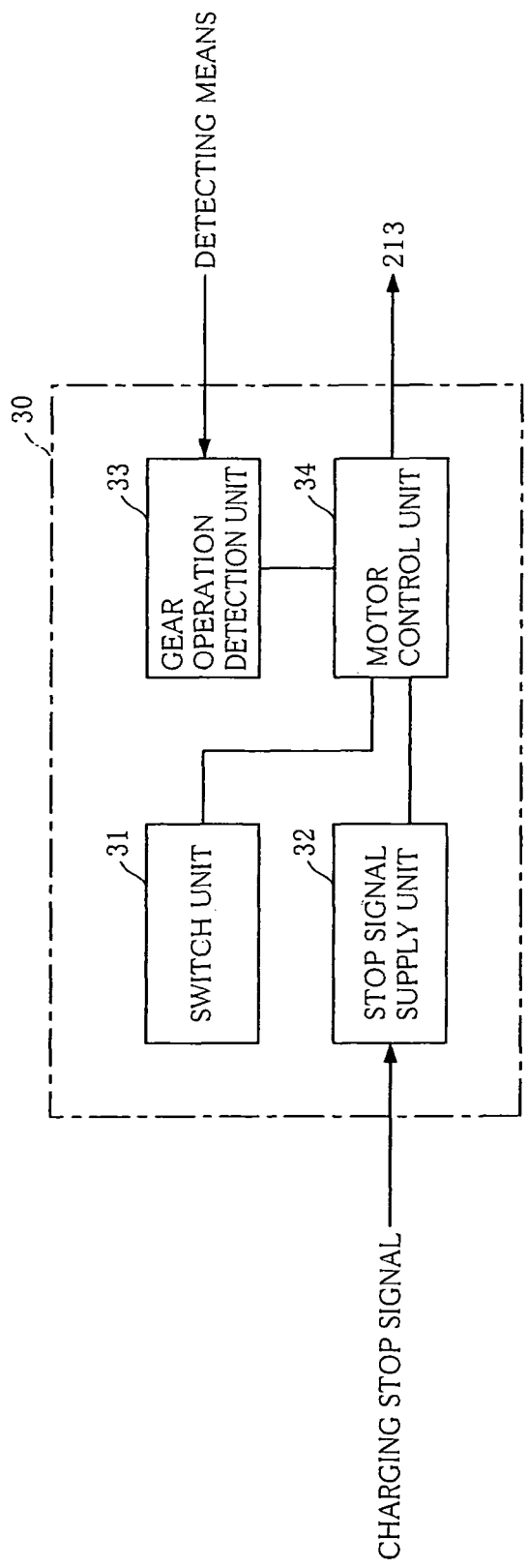
FIG. 5 is a block diagram showing a configuration of switch controlling means.

As shown in FIG. 5, this switch controlling means 30 has a switch unit 31, a stop signal supply unit 32, a gear operation detection unit 33, and a motor control unit 34.

The switch unit 31 has a remote function that can be switched when the commercial power supply is turned on. As a result, it is possible to avoid forgetting to perform manual switching.

Moreover, the switch unit 31 can be an ON-OFF switch that is manually changed over by a user. When this switch unit 31 is set to the ON side, the charging apparatus 1 starts the charging. On the other hand, when this switch unit 31 is set to the OFF side, the charging is stopped.

It is to be noted that, when the storage battery BTT is fully charged, the charging itself automatically stops. However, the switch unit 31 remains on the ON side, and hence a user manually changes over the switch unit 31 to the OFF side.

Upon receiving a charging stop signal from the charged-amount detection unit 14, the stop signal supply unit 32 supplies a stop signal to the motor control unit 34.

Additionally, upon receiving the charging stop signal from the charge control unit 16, the stop signal supply unit 32 supplies the stop signal to the motor control unit 34.

When the gear operation detection unit 33 detects that the gear portion 212 has rotated or rotationally moved, it supplies a detection signal to the motor control unit 34.

Here, as the relay 21 according to this embodiment, a limit type drum switch is adopted, and this relay switches the contact points at the same position like a motor of a wiper, thereby enabling free control by using a return servo circuit. Further, as an operation of the gear portion 212, reciprocating a distance between the contact point A and the contact point C which corresponds to approximately 180° can suffice, and hence providing means for detecting the rotation or the rotational movement of the gear portion 212 to at least one position enables repeating the same operation.

For example, at a time of detecting the rotation or the rotational movement of this gear portion 212, detecting means such as a limit switch or a photo coupler can be used. Specifically, a protruding portion is formed upright on the back side of the gear portion 212 in advance, and the detecting means is provided at a position where the protruding portion can be detected during the rotation or the rotational movement of the gear portion 212. Furthermore, when the detecting means detects the protruding portion, it supplies a detection signal to the gear operation detection unit 33. When the gear operation detection unit 33 receives the detection signal, it supplies the detection signal to the motor control unit 34.

It is to be noted that, as the detecting means, for example, an incremental encoder or an absolute encoder can be used besides the above-described means.

When the motor control unit 34 detects that the switch unit 31 has been changed over to the ON side (or the commercial power supply has been input), it drives the motor 213 of each switch 20 so that the contact point B216 can be connected to the contact point A215. With this driving of the motor 213, when the worm portion 211 rotates to rotate or rotationally move the gear portion 212 and the contact point B216 is connected to the contact point A215 through the rotating contact point 219, the charger 10 starts charging the storage battery BIT.

Moreover, when the motor control unit 34 detects that the switch has been changed over to the OFF side, it drives the motor 213 of the switch 20 so that the contact point B216 can be connected to the contact point C217. With this driving of the motor 213, when the worm portion 211 rotates to rotate or rotationally move the gear portion 212 and the rotating contact point 219 is disconnected from the contact point A215, the charging of the storage battery BTT using the charger 10 is stopped. Additionally, when the contact point B216 is connected to the contact point C217 through the rotating contact point 219, electric power supply to an electrical circuit (not shown) in a vehicle performed by the storage battery BTT begins.

Further, when the motor control unit 34 receives the stop signal fed from the stop signal supply unit 34, it drives the motor 213 of each switch 20 so that the contact point B216 can be connected to the contact point C217. As a result, when gear portion 212 rotates or rotationally moves and the rotating contact point 219 is disconnected from the contact point A215, the charging of the storage battery BTT which is performed by the charger 10 is stopped. Therefore, when the battery is fully charged, the charging can be automatically stopped. Furthermore, overcharge after full charging'can be avoided. Furthermore, when temperature anomaly of the storage battery BIT occurs, the charging can be immediately stopped.

(Output Control of Charging Voltage)

Output control over a charging voltage in the charge control unit will now be described with reference to FIG. 6 and FIG. 7.

Figure 6:
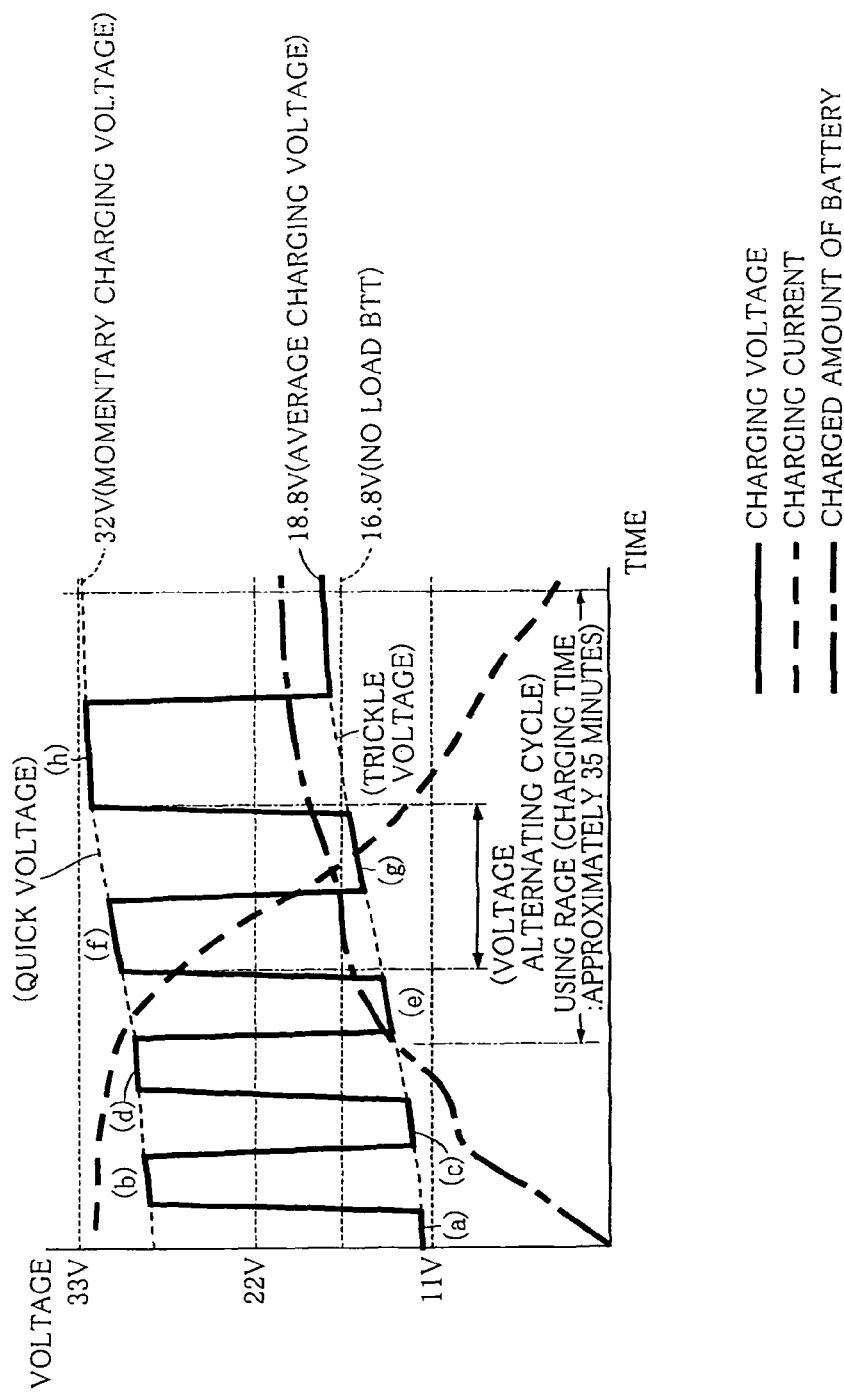
FIG. 6 is a graph showing changes in a charging voltage, a charged amount of a battery, and a charging current.

FIG. 6 is a graph showing changes in a charging voltage, a charging current, and a charged amount of the battery. FIG. 7 is a charged amount-switching time correspondence table in which a charged amount of the storage battery BTT is associated with an application time (a switching time) of the first voltage or the second voltage.

When the switch unit 31 is changed over to the ON side (or the commercial power supply is input) and the charging is started, the charged-amount detection unit 14 detects a charged amount of the storage battery BTT and supplies a detection value to the timing generator 15.

The timing generator 15 make reference to the charged amount-switching time correspondence table and determines output timing (a switching time) of a switching signal based on the charged amount supplied from the charged-amount detection unit 14. For example, when the charged amount is close to 11 [Ah], the switching time can be set to, e.g., 5 [sec].

The charge control unit 60 receives the trickle voltage from the current mixing unit 13-1 for the trickle voltage and also receives the quick voltage from the current mixing unit 13-2 for the quick voltage. Further, the trickle voltage is first supplied to the storage battery BTT to start the charging (FIG. 6(a)).

When 5 [sec] pass from the start of the charging, the timing generator 15 supplies the switching signal to the charge control unit 16.

Upon receiving the switching signal, the charge control unit 16 stops the supply of the trickle voltage and then supplies the quick voltage to the storage battery BTT (FIG. 6(b)).

When the timing generator 15 outputs the switching signal, it receives a charged amount from the charged-amount detection unit 14, refers to the charged amount-switching time correspondence table, and determines a switching time based on this charged amount. For example, assuming that the charged amount is approximately 22 [Ah], the switching time can be set to, e.g., 6 [sec].

When 6 [sec] pass from the previous output of the switching signal, the timing generator 15 supplies the switching signal to the charge control unit 16.

When the charge control unit 16 receives the switching signal, it stops the supply of the quick voltage and then supplies the trickle voltage to the storage battery BTT (FIG. 6(c)).

Here, when the storage battery BTT is a lithium battery, a product having a capacity of, e.g., 100 Ah is commercially available. When this lithium battery is charged, the charged amount rapidly increases as the charging starts, and the charging voltage is restored to approximately 80% in approximately 10 minutes. Furthermore, there is a tendency that the restoration to the last approximately 20% takes time and then the full charging is effected.

After approximately 10 minutes from the start of the charging, assuming that the timing generator 15 receives a charged amount indicative of 83 [Ah] from the charged-amount detection unit 14, it refers to the charged amount-switching time correspondence table and determines the switching time as 9 [sec] based on this charged amount.

When 9 [sec] pass from the previous output of the switching signal, the timing generator 15 supplies the switching signal to the charge control unit 16.

Upon receiving the switching signal, the charge control unit 16 stops the supply of the quick voltage (or the trickle voltage) and then supplies the trickle voltage (or the quick voltage) to the storage battery BTT.

In this manner, the timing generator 15 determines the switching time, i.e., a supply time of each of the trickle voltage and the quick voltage based on the charged amount of the storage battery BTT. Further, the charge control unit 16 alternately supplies the trickle voltage and the quick voltage to the storage battery BTT in accordance with the determined switching time.

It is to be noted that the timing generator 15 carries out control in such a manner that an output time of each of the first voltage (the trickle voltage) and (or) the second voltage (the quick voltage) in the charge control unit 16 is prolonged with an increase in charged amount of the rechargeable battery (the storage battery BTT or the assembled battery 200), and hence the timing generator 15 has a function as an "output control unit".

When such an operation is performed, the charging apparatus 1 alternately outputs the trickle voltage having a predetermined voltage value and the quick voltage having a predetermined voltage value different from that of this trickle voltage, thereby charging the storage battery BTT with the voltage values that are not smaller than the fixed voltage values.

Furthermore, as shown in FIG. 7, with an increase in charged amount of the storage battery BTT, the switching time can be prolonged. That is, with an increase in charged amount of the storage battery BTT, the timing generator 15 carries out control in such a manner that the output time of each of the trickle voltage and the quick voltage in the charge control unit 16 is gradually prolonged. As a result, a voltage alternating cycle (see FIG. 6) of the charging voltage gradually becomes long. Therefore, a charging current increases, and hence the charging time can be shortened.

For example, in case of the example shown in FIG. 6, an active voltage range of the storage battery BTT of 14 V is a range of a replenishing time (the charging) which is 11 V to 16.8 V, and it can be expected that the charging is completed in approximately 35 minutes. Although FIG. 6 shows a range of 0 V to 11 V for the sake of convenience, the voltage of the storage battery BTT cannot drop to 0 V in an automobile and the like unless something very unusual happens, and hence it can be considered that this range does not have to be included in the charging time.

It is to be noted that the "switching time" shown in FIG. 7 is a switching time common to the trickle voltage and the quick voltage, but the present invention is not restricted thereto, and a switching time of the trickle voltage and a switching time of the quick voltage can be individually set. For example, with the same "charged amount of the storage battery BTT", the switching time of the trickle voltage can be set longer or shorter than the switching time of the quick voltage.

Further, the respective values of the "charged amount of the storage battery BTT" and the "switching time" shown in FIG. 7 are values set for the sake of convenience in order to explain the "output control of the charging voltage". Therefore, the respective values of the "charged amount of the storage battery BTT" and the "switching time" are not restricted to the values shown in FIG. 7, and they can be arbitrarily set in accordance with performance and others of the battery as a charging target.

Furthermore, although the "switching time" shown in FIG. 7 is the switching time common to the trickle voltage and the quick voltage, but the present invention is not restricted thereto, and this switching time may be applied to one of the trickle voltage and the quick voltage, and the switching time of the remaining one of these voltages may be set in such a manner that it is not prolonged even though the charged amount of the storage battery BTT increases (an output time is set to be unchanged every time irrespective of the charged amount of the storage battery BTT). However, it is desirable to apply the "switching time" shown in the drawing to the quick voltage. That is because increasing an amount of the charging current with an increase in charged amount of the storage battery BTT is desirable.

Moreover, the timing generator 15 carries out control in such a manner that the output time (the supply time) of each of the first voltage (the trickle voltage) and the second voltage (the quick voltage) in the charge control unit 16 is prolonged as the charged amount of the storage battery BTT increases, and hence the timing generator 15 has a function as the "output control unit".

Additionally, although the quick voltage is applied for four times and the trickle voltage is applied for five times in FIG. 6, the switching control over the quick voltage and the trickle voltage is carried out in accordance with each switching time shown in FIG. 7, and hence the quick voltage and the trickle voltage are applied for reasonable numbers of times during the charging time (approximately 35 minutes in FIG. 6).

As described above, according to the charger and the charging apparatus according to this embodiment, since the trickle voltage having a predetermined voltage value and the quick voltage having a predetermined voltage value different from that of this trickle voltage are alternately output to charge the battery, and the charging voltage is not abruptly supplied from 0 V, but it is supplied as a voltage that has increased from the predetermined voltage value. Thus, a burden on the electrode plate of the battery can be alleviated, and a reduction in breakdown voltage and mechanical deterioration of the insulator of the electrode plate can be suppressed.

Further, since there is adopted the configuration where the plurality of chargers are provided and the dedicated charger is connected to each of the plurality of batteries (storage batteries) to perform the charging, the charging voltage can be reduced, and the larger amount of charging current can be allowed to flow. Therefore, the charging time of each battery can be shortened, and the charging time of the entire assembled battery can be greatly shortened.

Although the preferred embodiment of the charger and the charging apparatus according to the present invention has been described above, the charger and the charging apparatus according to the present invention are not restricted to the foregoing embodiment, and it is needless to say that they can be modified in many ways within the scope of the present invention.

Figure 8:
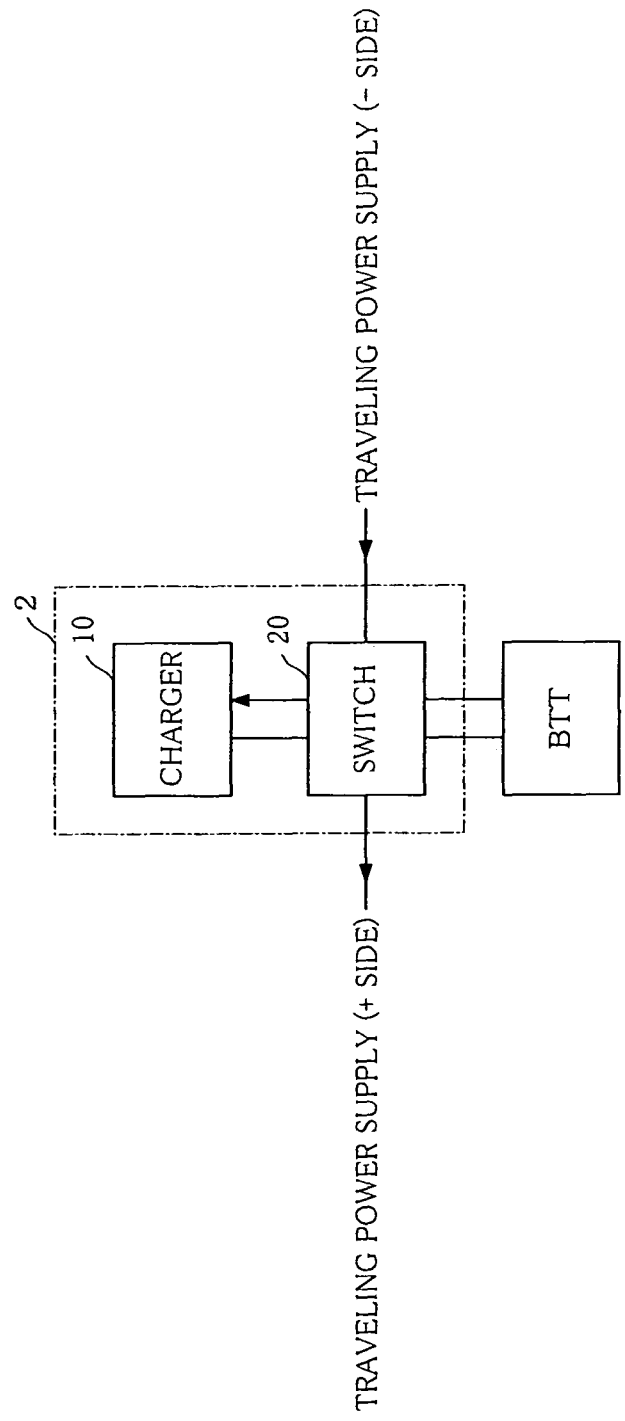
FIG. 8 is a block diagram showing a configuration of a charging apparatus comprising one charger and one switch.
Figure 9:
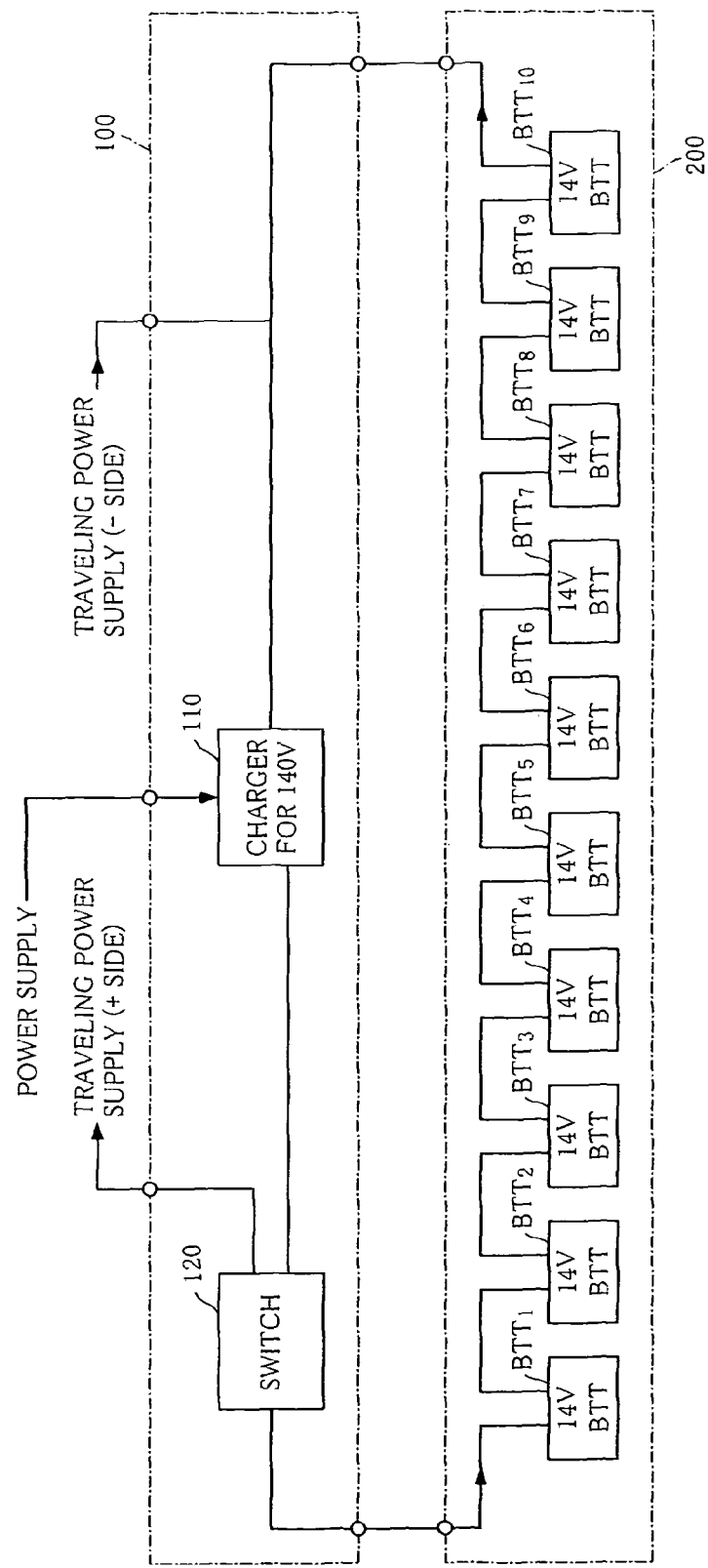
FIG. 9 is a block diagram showing a configuration of a conventional charging apparatus.
Figure 10:
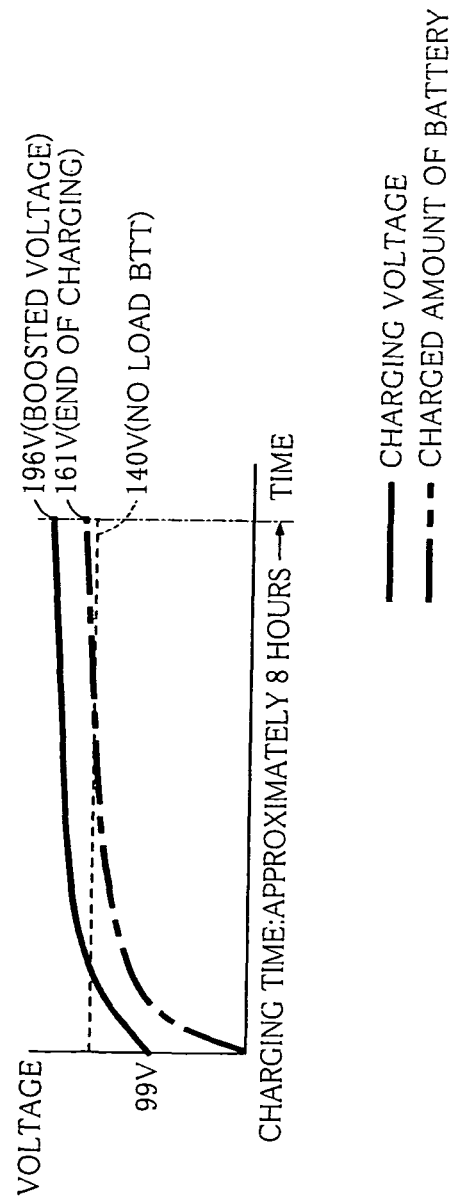
FIG. 10 is a graph showing changes in a charging voltage and a charged amount of the battery in the conventional charging apparatus.

For example, although the configuration in which the charging apparatus comprises the plurality of chargers has been described in the foregoing embodiment, the present invention is not restricted to the configuration comprising the plurality of chargers and, for example, as shown in FIG. 8, the charging apparatus may comprise one charger and one switch. In this case, the charger has such a configuration as shown in FIG. 2, and the charging voltage and the charging current are controlled in a transitive pattern shown in FIG. 6, whereby the charging time can be shortened. Additionally, when the switch has such a configuration as shown in FIG. 3, ON and OFF of the charging of the battery can be switched.

INDUSTRIAL APPLICABILITY

The present invention is the invention concerning the charging of the battery, and hence it can be applied to a device or an apparatus that perform the charging.

REFERENCE SIGNS LIST

1 charging apparatus

10 charger

11 inverter power supply (a first output unit, a second output unit)

14 charged-amount detection unit

15 timing generator (an output control unit)

16 charge control unit

20 switch

21 relay (an electric relay)

211 worm portion

212 gear portion

215 contact point A (a first contact point)

217 contact point C (a second contact point)

219 rotating contact point (a connection member)

30 switch controlling means

BTT storage battery

The invention claimed is:
1. A charger which charges a rechargeable battery, comprising:
a first output unit which outputs a first voltage;
a second output unit which outputs a second voltage having a predetermined voltage value higher than that of the first voltage;
a charge control unit which, when charging is started, receives the first voltage and the second voltage, alternately outputs the first or second voltage, and supplies the first or second voltage to the rechargeable battery as charging voltage;
a charged-amount detection unit which measures a charged amount of the rechargeable battery; and
an output control unit which determines an output time of the first voltage based on the charged amount of the rechargeable battery when the first voltage is started to be supplied to the rechargeable battery, and which determines an output time of the second voltage based on the charged amount of the rechargeable battery when the second voltage is started to be supplied to the rechargeable battery,
wherein the output control unit carries out control in such a manner that the output time of the second voltage in the charge control unit is gradually prolonged as the charged amount increases.

2. A charging apparatus which charges a plurality of rechargeable batteries, comprising:
a plurality of chargers, each comprising the charger according to claim 1,
wherein each of the plurality of chargers is connected to each of the plurality of the rechargeable batteries based on a one-on-one correspondence.

3. The charging apparatus according to claim 2, further comprising a plurality of switches between the plurality of rechargeable batteries and the plurality of chargers,
wherein each of the plurality of switches changes over a first path along which the plurality of rechargeable batteries is disconnected from each other and each of the plurality of chargers is connected to each of the plurality of rechargeable batteries and a second path along which each of the plurality of chargers is disconnected from each of the plurality of rechargeable batteries and the plurality of rechargeable batteries is coupled with each other.

4. The charging apparatus according to claim 3, wherein each of the plurality of switches has an electric relay which switches the first path and the second path, and the electric relay has: a first contact point connected to the first path; a second contact point connected to the second path; a connection member which is connected to one of the first contact point and the second contact point; a gear portion which rotates or rotationally moves to move the connection member; and a worm portion which rotates or rotationally moves the gear portion.

* * * * *